United States Patent

Brennan et al.

[15] 3,672,534
[45] June 27, 1972

[54] CLOSURE FOR HIGH PRESSURE CHAMBER

[72] Inventors: John F. Brennan, Des Plaines, Ill.; Universal Oil Products Company, Des Plaines, Ill.

[22] Filed: June 19, 1970

[21] Appl. No.: 47,852

[52] U.S. Cl. ............................... 220/46 P, 220/24.5, 220/25
[51] Int. Cl. ........................................................ B65d 53/00
[58] Field of Search .................. 220/46 R, 46 P, 24.5, 25, 64; 215/52

[56] References Cited

UNITED STATES PATENTS

| | | | |
|---|---|---|---|
| 1,903,168 | 3/1933 | Cordrey | 220/24.5 |
| 1,955,015 | 4/1934 | Price | 220/25 UX |
| 2,016,223 | 10/1935 | Bowers | 220/46 P |
| 2,142,012 | 12/1938 | Thompson | 220/25 UX |
| 2,330,306 | 9/1943 | Murphy | 220/64 x |
| 2,335,309 | 11/1943 | Pfleumer | 220/25 |
| 2,442,964 | 6/1948 | Simonsen | 220/24.5 X |
| 2,652,943 | 9/1953 | Williams | 220/24.5 X |
| 2,709,021 | 5/1955 | Jones | 220/24.5 |
| 2,142,012 | 12/1938 | Thompson | 220/25 UX |

FOREIGN PATENTS OR APPLICATIONS

| | | | |
|---|---|---|---|
| 501,102 | 11/1954 | Italy | 220/24.5 |
| 333,400 | 8/1930 | Great Britain | 220/24.5 |

Primary Examiner—Joseph R. Leclair
Assistant Examiner—James R. Garrett
Attorney—James R. Hoatson, Jr. and Philip T. Liggett

[57] ABSTRACT

A closure system for a high pressure chamber which is particularly designed to permit the use of an interior glass coating or other non-metallic liner material. The closure design includes a demountable cover for a chamber opening, a gasket member which will extend around the interior periphery of the opening, and an inner "piston" member, which will assist in providing a sealing of the gasket member around the chamber opening. A release bolt provides for pushing inwardly against the inner piston member so as to let fluid pressure into or out of the chamber from a port located centrally in the cover member at a zone opposed by the piston member.

4 Claims, 4 Drawing Figures

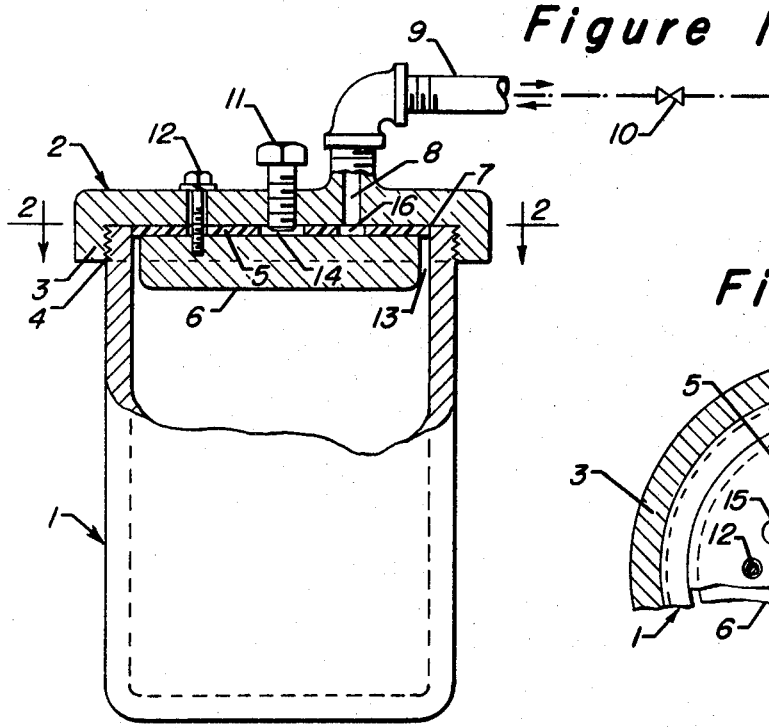
Figure 1
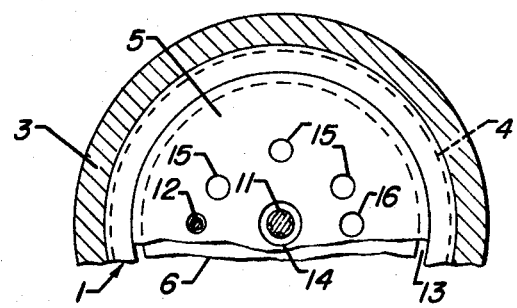
Figure 2
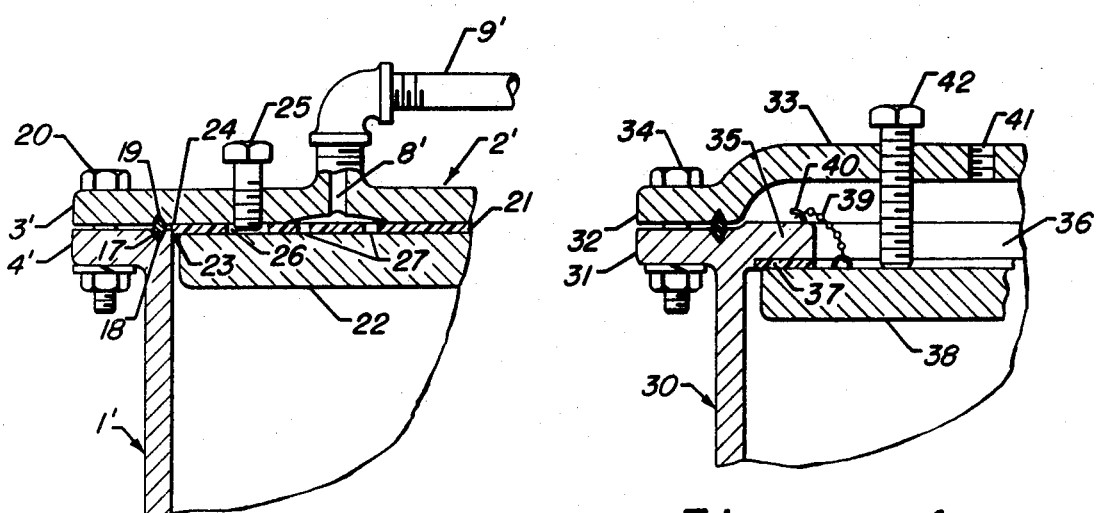
Figure 3
Figure 4
INVENTOR:
John F. Brennan
BY: James R. Hoatson, Jr.
Philip T. Liggett
ATTORNEYS

CLOSURE FOR HIGH PRESSURE CHAMBER

This invention relates to a closure construction for an autoclave or other high pressure chamber such as may be used in a chemical plant or research laboratory. More specifically, the design is such that internal pressure is used to assist a gasket and a piston member in self-sealing the gasket around the opening to the chamber and, at the same time, permits the use of a glass coating, or other non-metallic liner for the interior of the chamber without causing a cracking of such coating during the closing thereof or while it is in operation.

There are various closure designs which are utilized in connection with laboratory type high pressure chambers, such as autoclaves, "bombs", etc., as well as with high pressure reactor vessels in processing units. However, such closures are generally of elaborate and expensive designs and constructions. Also, most of the present designs are not adapted to providing for an internal glass coating, in that any tight contacts against the coating can cause a cracking thereof. A cracking or shattering of a glass coating can, in turn, lead to errors or inaccuracies in certain analytical work or affect a catalytic reaction, particularly where stainless steel or other active metals will become exposed to the reactant streams. Typical autoclaves also have their fluid port means provided through a wall portion of the chamber, rather than through a portion of the removable cover means at a point sealed from the interior of the chamber by the gasket means of the unit. As a result, any metallic inlet-outlet piping and the metal for a particular accompanying valve means can be exposed to the same reactant conditions taking place in the chamber itself.

It is thus a principal object of the present invention to provide an improved pressure chamber closure design which is particularly adapted to have an interior coating but will preclude the need to have face to face compressive attachments of any of the coated surfaces.

It is a further object of the invention to provide a vessel closure which uses a deformable gasket member positioned to effect an internal pressure seal around the periphery of the opening to the chamber.

Another object of this invention is to provide a closure system which has the inlet-outlet port means through the cover member and behind the gasket means such that reactants and reaction products in the pressure chamber are sealed from such port and from any valving means connecting to the chamber.

Still another object of the invention is to have a threaded bolt type release means to overcome internal pressure on a piston type of gasket holding member and thus permit release of pressure in the chamber.

In a broad aspect, the present invention provides a closure system for a high pressure chamber which comprises in combination, a pressure tight chamber with an enlarged opening thereto, a deformable gasket member sized to fit into said chamber and encompass at least the peripheral area of said opening, a cover member for said chamber tightly attachable thereto and extending over said chamber opening, inlet-outlet port means to said chamber extending through said cover member, a piston member to be opposite said cover member that is sized to slip fit into said chamber opening and to encompass said gasket member whereby a build-up of internal pressure against the interior face of the piston member will in turn bear against said gasket member and seal the latter around the inside of the opening from said chamber, and threaded bolt means through said cover member to provide pressure contact with the exterior face of said piston member whereby to permit a release of the seal between the latter and said gasket member.

In the event that it is desired to have a pressure chamber provided with a glass coating so as to preclude a metal influence upon a reaction taking place in the high pressure chamber, then the entire interior wall portion of the pressure chamber will be provided with the coating, as well as the interior surfaces of the piston member. However, it is unnecessary to have the inner face of the cover member or the outer edges or outwardly projecting flange portions of the chamber coated where there will be abutting contacts and a chance for shattering of the glass coating.

In accordance with a principal feature of the present invention, there will be a gasket member encompassing the chamber opening or at least reaching the periphery of the opening such that the inside face of the cover will be sealed from the interior of the chamber itself. Thus, it will be noted that the gasket member in certain embodiments shall have a full coverage of the periphery of the cover member where it abuts the opening to the inside of the pressure chamber such that the edge or peripheral portion of the gasket will cover the juncture between the opening to the chamber and the closure member. Thus, the gasket should have sufficient thickness or a thickened edge, so that when internal pressure is supplied to the chamber, there will be a squeezing of the piston member against the gasket and against the inside face of the closure member such that there is a seal between the two as well as a squeezing of the gasket member toward and over the juncture between the chamber and the removable closure member. At the same time, internal pressure will provide a direct self-sealing action with respect to the periphery of the gasket member to squeeze it into the aforesaid juncture.

In other embodiments, the gasket member will encompass the inside periphery of a non-circular chamber opening and the piston member sized to fit into the opening and then be turnable to fit over the gasket for a self-seal operation.

It will also be noted that it is a particular feature of the present invention to have the port means to the chamber in the central portion of the cover member in a manner to be "behind" or upstream from the gasket member and the piston member. Thus, when the gasket is sealed around the chamber opening by the piston member, the inlet-outlet port as well as the valve means connecting thereto, will be shielded from the reaction process taking place in the chamber. However, in view of this port arrangement, it is necessary to have a release bolt means provided between the cover member and the piston member such that the latter can be temporarily held away from the gasket to permit the fluid flow into the pressure chamber or, alternatively, to permit a release of pressure from the inside of the chamber and an escape of fluids through the port means.

The present improved closure system may make use of a soft metal gasket material in the event that there is no need to have a non-metallic reaction chamber; however, in connection with a non-metallic chamber or autoclave, then the gasket material should be of teflon or comprise a teflon coated deformable sheet-like material, such that the gasket is capable of having a peripheral portion cover over and provide a self-sealing operation with respect to the chamber or the juncture between the inside wall of the chamber and the cover member.

Reference to the accompanying drawing and the following description thereof will serve to illustrate certain embodiments of the present improved and simplified closure system as well as point out advantageous features which may be obtained from such closure arrangement.

FIG. 1 of the drawing is a sectional elevation view indicating a simplified form of the high pressure closure system with an internal piston member available to push against the inside face of a deformable gasket member.

FIG. 2 is a partial sectional plan view, showing the top of the gasket member being used between the piston member and the removable cover member, as indicated by line 2—2 in FIG. 1.

FIG. 3 indicates in a partial sectional elevational view the use of flange means between the chamber and the removable cover member as well as a relocation of the release bolt and port means for the cover member.

FIG. 4 shows in a partial sectional elevational view the placement of a gasket and the piston member below a non-circular opening and within the interior portion of the pressure chamber.

Referring now particularly to FIGS. 1 and 2 of the drawing, there is indicated a pressure chamber 1 having a removable cover member 2 which has an internally threaded outer rim portion 3 adapted to engage external threads 4 around the upper end portion of chamber 1. Thus, there is provided means for removably attaching the cover means 2 over the end of an open-ended cylindrical-form pressure chamber 1.

In accordance with the present invention, the underside, or interior face, of the cover member 2 is provided with a sheet-like gasket member 5; and interiorly of such gasket there is positioned a thick piston-like member 6 which will be sized to fit within the opening provided by the interior wall of chamber 1. It is required that the gasket member 5 be large enough to reach or encompass the opening to the interior of chamber 1 and thus cover over the crack or junction line 7 that exists on the inside of the chamber, i.e. between its inside wall and the inside face of the cover member 2. With respect to piston member 6, it is not necessary that it be a tight fit within the inside wall of the chamber 1 inasmuch as it should slip easily into the chamber and, as desired, internal pressure can pass around the periphery of the piston and effect a self-sealing operation against the edge portion of the gasket 5 to cause the latter to be pushed into the juncture 7 and provide a pressure tight connection between the cover member 2 onto the chamber 1.

Also, as a feature of the present invention, it is to be noted that the cover member 2 is provided with an inlet-outlet port means 8 through a central portion thereof such that its passageway will terminate above a central portion of the piston member 6 as well as into a central portion of the gasket means 5. An adjustable control valve 10 may be connected directly to the port means 8, or as indicated, it may be in piping means 9 so as to be a short distance from the chamber 1. By this arrangement, the port means and the valve means 10 are precluded from having internal exposure to the inside of the reaction chamber 1 and to the reaction conditions taking place therein. In other words, where it is desired to have a completely non-metallic surface for the reaction conditions in the pressure chamber 1, then the latter, as well as the interior walls of the piston 6, may be entirely glass coated, such that there is no metal being exposed to the reaction conditions.

As provided by the present construction, the cover member 2 is also provided with a release bolt means 11 which is threaded entirely through the cover such that the end of the bolt may bear against the upper surface of the piston member 6 and, as required, provide for the breaking of the seal between the piston member 6, the gasket means 5, and the inside face of the cover member 2. In addition to the release bolt means 11, one or more bolts 12, shown extending through cover member 2 and threadedly connecting into the top portion of the piston member 6, may be provided to hold the latter in position against the gasket means 5 while the entire closure portion is being attached to the pressure chamber 1. The bolt means 12 may also be used to effect an initial pressure and seal between piston member 6 and gasket means 5.

In the operation of the closure system as provided by this invention, the assembly as shown in FIGS. 1 and 2 will be provided by having the top cover member 2, and the attached gasket means 5 and piston member 6, tightly clamped to the end of the chamber 1 as a first stage of closure. Subsequently, the reactant streams can be introduced into the interior of chamber 1 through pipe means 9 and port means 8 to then flow across the face of the gasket member 5 and into the peripheral passageway area 13 around piston member 6. As internal pressure builds up within chamber 1, there will be an outward push against the inside face of piston member 6, as well as against the peripheral edge portion of gasket 5 so as to cause the latter to self-seal the juncture 7 between the cover means 2 and the inside of the wall of chamber 1.

When it is desired to release pressure from the inside of chamber 1 after a desired reaction, then bolt means 11 may be turned so as to exert pressure against the top of piston member 6 and break the pressure seal between the latter and the gasket 5 whereby fluid pressure can escape through peripheral passageway means 13, across the face of gasket 5 and into the port means 8 to then pass outwardly by way of pipe 9 and valve 10.

With respect to the piston member 6 itself, it is to be noted that it should be of sufficient thickness, or sufficiently stiffened, such that it can provide a "beam action" with a minimum amount of deflection when the bolt means 11 is pushed against the top surface of piston member. The beam action is necessary in order that the piston member 6 can be pushed down and release the entire seal with the face of the gasket member 5, at such times as it is desired to release internal pressure from the sealed unit. If the piston member 6 is deformable, then it will take undue movement by bolt means 11 to effect a breakage in the seal around the edge of the piston and the periphery of gasket member 5. Also, since the present construction is particularly adapted for use with a glass coated liner for the chamber 1 and for the interior surfaces of the piston member 6, it is necessary that the latter be sufficiently stiff and rigid as to preclude its being bent or deformed, from the pressure from bolt means 11, that would cause the glass coating to be cracked or shattered. However, it is to be noted that by the proper placing of a reinforcing rib or stiffener means in alignment with the release bolt means 11, there can be a piston member 6 that is of less thickness than might otherwise be required in the absence of a stiffening rib means.

It is not intended to limit the gasket 5 to any one type of material inasmuch as it may be of any deformable material capable of providing the function of the present gasket. For example, where metallic gasket means are not objectionable, then such deformable sheet-like gasket member may be provided of copper or of a copper-clad material and provide a member capable of being deformed into the juncture means 7 in effecting a self-sealing type of closure. On the other hand, in accordance with the preferred construction that is provided by the present invention, and where a non-metallic liner is desired for the entire autoclave unit, then the gasket 5 will be provided of a sheet-like material that is deformable, such as of teflon, or of a teflon coated heat resistant material, such as teflon over an asbestos fabric, a fiber glass fabric, etc. The deformability is necessary to the extent that it is desired to have the peripheral edge be self-sealing within the juncture 7 between the inside wall of the chamber and the cover member 2.

With particular reference to FIG. 2 of the drawing, it is to be noted that the gasket member 5 may be provided with a central opening 14 so as to permit the end of bolt means 11 to bear directly against the upper face of piston member 6. Additional openings 15 may be provided within the central portion of the gasket member 5 such that there may be easy fluid flow between the upper face of piston member 6 and the lower or internal face of cover member 2 from port means 8 at such times as fluid flow is being permitted into or out of the pressure chamber 1. There is also indicated an opening 16 directly in alignment with the interior end of port means 8; however, it should be noted that all of the openings which may be provided in the gasket member 5 should be within the central portion thereof and away from its peripheral edge portion so as to maintain an adequate seal between the piston member 6 and the outer peripheral portion of the gasket member 5 as the latter is being pressed by internal pressure against the interior face of cover member 2.

In FIG. 3 of the drawing, there is indicated a modified pressure chamber 1' to the extent that the latter has an outwardly projecting flange 4' adapted to engage a flange portion 3' for a cover member 2'. There is also indicated the use of an O-ring type gasket 17 positioned in opposing grooves 18 and 19 in, respectively, the flange 4' and the cover 2' whereby a plurality of bolts 20 can effect the removable clamping of cover member 2' to the chamber 1'. In addition to the O-ring 17 and in accordance with the present improved construction, there is a flat sheet-like gasket 21 which extends transversely over the entire interior face of the cover member 2' and in between the latter and the piston member 22. Again, the gasket member 21 shall be deformable and shall have sufficient thickness, at least around its edge portion, whereby such edge 23 can be wedged into and provide an internal seal for the juncture line 24 between the inside top edge of the pressure chamber 1' and the inner face of the cover member 2'.

As indicated in connection with FIG. 1 of the drawing, the piston member 22 shall be sized to be a slip fit into the inside of the chamber 1' and shall have sufficient thickness so as to provide a suitable beam action in permitting internal pressure to squeeze against the gasket member 21 or, conversely, to have release bolt means 25 through cover member 2' effect a pushing away of piston member 22 and break the internal pressure seal against the gasket 21.

In the present embodiment of FIG. 3, the release bolt means 25 is shown off-center, but shall still be positioned within a central portion of the gasket member 21 and the piston member 22 such that there is an adequate peripheral seal between the two members and beyond the release bolt means 25. Pipe means 9' is shown connecting to a port 8', which in this instance is located centrally within the cover member 2', whereby fluid flow into and out of the pressure chamber 1' will be in the central portion of the cover 2' and above the central portion of piston member 22. Preferably, an opening will be provided in the gasket 21 at the interior end of the bolt means 25 whereby the latter can bear directly against the top surface of the piston member 22 without cutting into the gasket material. Also where desired, additional holes or openings, such as 27, may be provided within the central portion of the gasket member.

The operation of the closure means, as shown in FIG. 3, will be similar to that shown in FIG. 1, except that in this instance the initial clamping is provided between flange bolt means 20, in lieu of the threaded attachment. Following the initial closure, there can be reactant stream introduction into the unit by leakage around and through holes in gasket member 2' such that a desired internal pressure is obtained within chamber 1'. As pressure builds up to the desired level in the autoclave, there will be pressure against the piston member 22 and the latter is free to exert an internal self-sealing pressure against the face of gasket 21 when flow is stopped through port 8'. Also, the edge portion 23 of gasket 21 will be self-sealed into the juncture 24 between cover member 2' and internal wall portion of chamber 1'.

When it is desired to release pressure from the chamber 1', then bolt means 25 will be tightened to push against the top of piston member 22 and let the pressurized fluid escape between the upper face of the latter and the gasket means 21 such that it may reach port means 8' and pipe means 9'.

In FIG. 4 of the drawing, there is shown a pressure chamber 30 with an outwardly projecting flange 31 provided to correspond with a flange portion 32 on a cover member 33 such that the latter may be tightly clamped to the chamber with bolt means 34. For this particular embodiment there is shown an inwardly projecting flange or shoulder portion 35 which defines an upper chamber opening 36, that is in turn encompassed by a flat ring type gasket member 37. Also for this embodiment, where the gasket 37 and the piston member 38 will be inside of the opening 36 and must necessarily have somewhat larger peripheries than the latter, then the opening 36 will be of an oval or rectangular form. In other words, it is required that the opening 36 be non-circular such that the piston member 38 can be inserted end-wise and then turned in a manner to be brought up against the lower face of gasket 37 around the interior face of shoulder 35. For convenience in holding the piston member 38 during placement, there may be provided chain means 39 and hook means 40 on shoulder 35, or other equivalent temporary attachment means.

It will also be noted that cover member 33 is provided with a port means 41 and release bolt means 42 such that a pressure release operation can be carried out in the same manner as for the embodiment of FIGS. 1 and 3.

It should be noted that the present drawing is merely diagrammatic and that variations may be made with respect to the size or configuration of the pressure chambers 1 or 1'. Also, various conventional shapes and designs may be made with respect to the attachment or clamping of cover members to the end portion of the pressure chamber. Where desired, more than one release bolt means may be utilized; however, for a smaller sized autoclave or reactor chamber, the use of a single bolt will generally be sufficient. In any case, it will be observed that the present improved closure system is of particular advantage in connection with glass coated or other lined reactor chambers, where non-metallic surfaces are desirable and where glass coating, or other shatterable liners, can be eliminated from the flange sections or from threaded sections between chamber and closure members. For example in FIG. 3 of the drawing, the opposing flange portions 3' and 4' for the autoclave unit can be free of a glass coating such that an O-ring type gasket 17 may be utilized in a conventional manner while, at the same time, a glass coating may be provided on the interior wall surfaces of the chamber 1', and the piston member 22 and only the soft deformable gasket material 21 will be in contact with such coating. As used herein, the term "glass coating" shall not only comprise glass, but may be a fired porcelain enamel coating or any of the glazed ceramic type coatings which can be applied to a metal surface.

I claim as my invention:

1. A closure system for a high pressure chamber, which comprises in combination, a pressure chamber with an opening thereto, a deformable gasket member sized to fit into said chamber and extending across the entire area of said opening, a cover member for said chamber tightly attachable thereto and extending over said chamber opening, said cover and said gasket member having first and second openings therethrough, inlet-outlet port means to said chamber extending through said cover member and said gasket member, a substantially non-deformable piston member opposite and movably attached to said cover member sized to slip-fit into said chamber opening and to underlie said gasket member, said gasket member seating around said first and second openings, and being deformable into the juncture between said cover member and the inside wall of the chamber, whereby upon application of internal pressure against the inside face of the piston member, said gasket member seals around said first and second openings and over said juncture, and threaded bolt means through said second opening to provide pressure contact with the exterior face of said piston member thereby to permit a release of the seal between the latter and said gasket member.

2. The closure system of claim 1 further characterized in that said cover member has an external flange portion sized to oppose an outwardly projecting flange portion on said high pressure chamber whereby the cover may be removably clamped to said chamber, and each of said flange portions are provided with V-grooves positioned in an opposing manner and accommodate an O-ring type gasket.

3. The closure system of claim 1 further characterized in that the interior face portions of said piston member and the interior wall portion of said high pressure chamber are provided with a non-metallic coating material.

4. The closure system of claim 3 still further characterized in that said gasket is formed of teflon and the interior non-metallic coating is a glass coating.

* * * * *